Nov. 14, 1967 D. F. FAIRBANKS 3,352,008

PROCESS OF BONDING COPPER FOIL TO FOIL CONTAINING SUPERCONDUCTIVE LAYER SUCH AS NIOBIUM STANNIDE

Original Filed May 3, 1963

United States Patent Office 3,352,008

Patented Nov. 14, 1967

3,352,008

PROCESS OF BONDING COPPER FOIL TO FOIL CONTAINING SUPERCONDUCTIVE LAYER SUCH AS NIOBIUM STANNIDE

Daniel F. Fairbanks, Winchester, Mass., assignor, by mesne assignments, to National Research Corporation, Cambridge, Mass., a corporation of Massachusetts, newly organized Original application May 3, 1963, Ser. No. 277,899, now Patent No. 3,309,179, dated Mar. 14, 1967. Divided and this application Jan. 20, 1966, Ser. No. 550,068
3 Claims. (Cl. 29—599)

ABSTRACT OF THE DISCLOSURE

Process for bonding copper foil to a foil superconductor of the type having a surface layer of $Nb_3Sn$. The foils are brought together with a low melting solder in between and passed through spaced rolls.

This application is a division of S.N. 277,899, filed May 3, 1963, now Patent No. 3,309,179.

This invention relates to superconductors, and more particularly to alloys known as "hard superconductors," which are used in the manufacture of solenoid coils and the like.

It has been found advantageous to coat superconductive wire with a coating of copper or other material of low thermal and electrical resistance before winding it into high field magnetic solenoids. The presence of the copper permits the wire to carry currents which would be expected on the basis of tests on short samples of the wire. Without it, the currents are considerably less; e.g., one-half of short-sample test values. Probably, the effect of copper is mainly due to its low electrical resistivity and its consequent ability to pass current around sections of the wire which may temporarily go normal. The bypassing of the current in this manner minimizes local heat production in the coil and reduces variations in the magnetic field. In addition the presence of copper is helpful in speeding the removal of heat from the winding to its surroundings.

The present invention seeks to achieve the benefits of such coating on $Nb_3Sn$ superconducting wires and ribbons of the type disclosed in the copending application of Allen Stauffer, S.N. 133,653, filed Aug. 24, 1961, and in the copending application of Allen, Das and Stauffer, S.N. 207,320, filed July 3, 1962. However, it should be understood that the invention is also applicable to various other elongated superconductors in the form of wire, ribbon, plate and other regular shapes, as described, for instance, in the copending application of Saur, S.N. 208,925, filed July 10, 1962, and in Aviation Week and Space Technology Magazine, Oct. 9, 1961, p. 84. In these references, an outer coating of $Nb_3Sn$ is formed on a substrate of refractory metal, as a decomposition coating in the last case and as a diffusion coating in the others. The exposed position of the $Nb_3Sn$ layer militates against the use of conventional extrusion or drawing processes for cladding the $Nb_3Sn$ with copper; the brittle $Nb_3Sn$ layer might be damaged in such processes. As noted in the above copending application of Saur, the coating may comprise hard superconductor alloys other than $Nb_3Sn$, such as $Nb_3Al$, $V_3Ga$ and $V_3Si$. The present invention is also applicable to such variations.

It is an object of the present invention to provide a technique of preparing superconductors clad with a heat dissipating and electric current-bypassing coating, without resort to excessive compression of the superconductor.

It is a more specific object of the invention to provide a ribbon superconductor comprising a niobium base with an $Nb_3Sn$ coating and an outer layer of copper or other high conductivity substitutes, bonded to the outer surface of the $Nb_3Sn$ via a thin bond metal layer which is compatible with the $Nb_3Sn$ layer.

These and other objects of the invention will in part be obvious and will in part appear hereinafter.

The invention accordingly comprises the process involving the several steps and the relation and order of one or more of such steps with respect to each of the others, and the resulting product, which are exemplified in the following detailed disclosure and the scope of the application of which will be indicated in the claims.

For a fuller understanding of the nature and objects of the invention, reference should be had to the following detailed description taken in connection with the accompanying drawings wherein.

The metal of choice for the heat and current dissipating layer is copper. However, in accord with the present invention, because of their excellent conductivities at cryogenic temperatures, tungsten or cadmium may be used in similar fashion. Other metals which may be used are aluminum, indium, silver, lead, tin and sodium. In each case the pure element should be used. Generally, the superconductor will be used at liquid helium temperature where the electrical and thermal resistivities of the pure metals are lower than those of their respective alloys.

Figure 1:
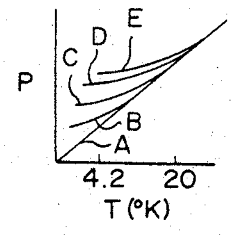
FIG. 1 is a graph illustrating the considerations which govern the choice of methods of forming a heat and current dissipating layer.

As noted above, conventional extrusion and cladding processes are not suitable for applying the copper layer, due to the brittle nature of the superconducting layer. Electroplating avoids the danger of damaging the superconducting layer, but tends to contaminate the copper layer. The effect of contaminants is shown in the graph of FIG. 1 wherein curve A is the resistivity curve of pure copper and curves B, C, D, E indicate the effect of contaminants and alloying elements.

According to the present invention a very thin layer of metallic solder is interleaved between the superconducting and copper layers and the cladding is accomplished by heating the flux to its melting point. The solder is selected as an alloy of low melting point and good electrical conductivity at liquid helium temperature. The material designated for this purpose in the present invention is the eutectix mixture of tin and indium, a commercially available solder having a melting point of about 120° C. Further, this material has been discovered to be superconductive at liquid helium temperatures and low external magnetic fields up to 2 kilogauss, a factor which enhances its suitability for present purposes.

Figure 2:
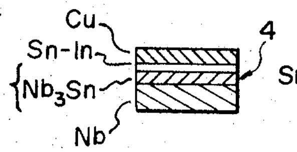
FIG. 2 is a cross-section of a superconductive ribbon made according to the present invention.

FIG. 2 shows a cross-section of ribbon assembly 20 after the copper cladding is completed in accordance with the new method described below. The copper layer is bonded to the $Nb_3Sn$ layer via a thin layer of tin-indium eutectic. It has been found by experiments that a eutectic composition of tin-indium alloy in contact with the $Nb_3Sn$ layer will not adversely affect its superconductivity. It is believed that the alloy can be varied to as much as from 15:85 to 95:5 of tin to indium with similar results. It is also believed that a similar range of tin-lead alloys can be used. It should be noted that a eutectic composition of tin-indium offers a lower melting point than the above-suggested alternates and that it is desirable to work at the lowest possible temperatures to avoid contaminating the $Nb_3Sn$ while working in atmosphere. Whatever solder is used, the temperature must be kept low enough to avoid excess formation of copper alloys which are poor heat and electrical conductors compared to copper. Where cadmium or tungsten are used in lieu of copper, the choice of solder is wider since these metals are less reactive with tin (in the solder or in the $Nb_3Sn$ layer) than is copper.

Figure 2A:
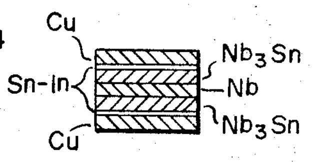
FIG. 2A is a variation of FIG. 2 wherein the current carrying capacity is increased by the use of multiple superconductive layers.

FIG. 2A shows a variation of FIG. 2 wherein the original superconductive ribbon has $Nb_3Sn$ coatings on both sides and copper is clad on both sides in accord with the present invention.

Copper clad ribbon, shown in FIGS. 2 and 2A can be wound into a magnet without further treatment. However, it is preferred, in each instance, to first coat the entire ribbon with a conventional dielectric insulation. When the magnet is put into a cryogenic bath the current will be carried entirely by the $Nb_3Sn$ layers. If small sections of the $Nb_3Sn$ layer return temporarily to normal state conduction of electric current, the copper layers in intimate contact therewith will allow current to bypass these sections and will minimize resistance heating since copper has a very low resistivity at cryogenic temperatures and a substantial cross-section in the arrangement shown. The resistance heating which does occur is dissipated by the excellent thermal conductivity of the copper. When a section of ribbon goes normal, the copper dissipates the resistance heat in a manner tending to avoid extreme localization of temperature rise in the ribbon with consequent destruction of the ribbon at the overheated locality. The copper or other metallic foil used should be soft, annealed metal with a thickness of .0005 to .001 inch. For simplicity, only the method for cladding the ribbon shown in FIG. 2 is described below.

Figure 3:
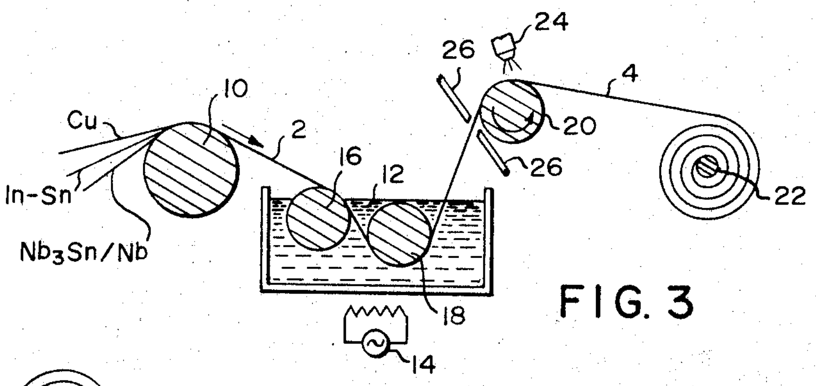
FIG. 3 is a schematic diagram of one embodiment of the cladding process of the invention showing the application of conventional elements of apparatus.

FIG. 3 shows copper (Cu), indium-tin (In-Sn) and superconductor ($Nb_3Sn$/Nb) foils being assembled into a foil assembly 2, passed over a roll 10, and then into a liquid bath 12 (heated by heater 14) over rolls 16 and 18 and then out of the bath past a shield 26, over a roll 20 where the composite foil (now indicated by number 4) is sprayed with coolant from a nozzle 24 and then rolled up at 22.

Figure 4:
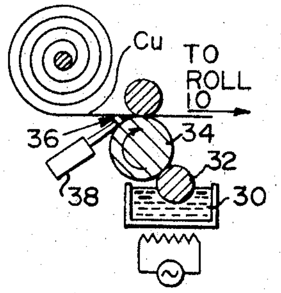
FIG. 4 is a schematic diagram showing a variation of another part of the process of FIG. 3.

FIG. 4 shows a variation of the FIG. 3 apparatus wherein, instead of interleaving solder between the copper and superconductive foils, the solder is transferred from a bath 30 over rolls 32 and 34 to a coating zone 36 where it is contacted by a conventional ultrasonic soldering iron 38 and then transferred to the roll 10 for contact with the superconductor foil to form the foil assembly 2.

Figure 5:
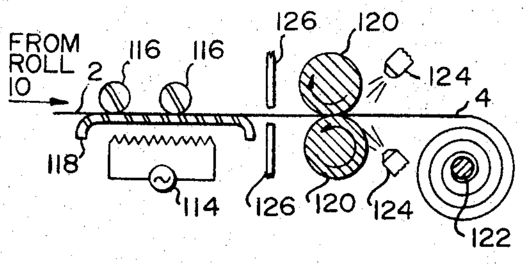
FIG. 5 is a schematic diagram showing a variation of another part of the process of FIG. 3.

Referring now to FIG. 5 there is shown a variation of some of the apparatus in FIG. 3. The foil assembly 2 is passed between a stainless steel shelf 118 and rollers 116, where it is heated by heater 118 to the melting point of the solder and then passed through driven rollers 120 to a wind-up roll 122. The minimum spacing between rollers 120 is equal to the thickness of the foil assembly 2, less the average thickness of the flux layer, and the maximum spacing is the thickness of the foil assembly 2, plus about 10%. Thus, a gentle compression is applied to the foil assembly 2 to spread the solder and drive out included gases without damaging the $Nb_3Sn$ layer. Water cooling jets 124 and shields 126, similar to those of FIG. 3, are also provided.

Since certain changes may be made in the above process without departing from the scope of the invention herein involved, it is intended that all matter contained in the above description, and shown in the accompanying drawings, shall be interpreted as illustrative and not in a limiting sense.

What is claimed is:

1. A process of cladding a first foil of soft metal to a second foil containing a surface layer of hard superconductive alloy, selected from the group consisting of $Nb_3Sn$, $Nb_3Al$, $V_3Ga$, $V_3Si$, without breaking up said surface layer or degrading the superconductivity thereof and with the result that the second foil when wound into magnetic solenoids is enabled to carry currents superconductively at levels substantially equal to the short, sample foil performance of the second foil, the process comprising the steps of forming a foil assembly with said first and second foils in face-to-face relation, the superconductive surface layer facing inwardly, with a bonding metal between said foils in the foil assembly, passing the foil assembly between rollers and a heated plate to melt the bonding metal and then passing the foil assembly between a pair of spaced rolls having a spacing at least equal to the combined thickness of the first and second foils and no greater than the combined thickness plus about 10% so that a gentle compression is applied to the foil assembly to spread the bonding metal and drive out included gasses without damaging the superconductive layer, and then cooling the foil assembly.

2. The process of claim 1 wherein said second foil contains a said surface layer on each face, and two of said first foils are provided against opposite faces of said second foil.

3. The process of claim 1 wherein the bonding metal is initially coated on at least one of said first and second foils before assembling the first and second foils.

References Cited

UNITED STATES PATENTS

| | | | |
|---|---|---|---|
| 132,338 | 10/1872 | Warden | 29—502 X |
| 2,984,901 | 5/1961 | Cunningham | 29—501 X |
| 3,184,303 | 5/1965 | Grobin. | |
| 3,218,693 | 11/1965 | Allen | 29—155.5 |

WILLIAM I. BROOKS, *Primary Examiner.*